UNITED STATES PATENT OFFICE.

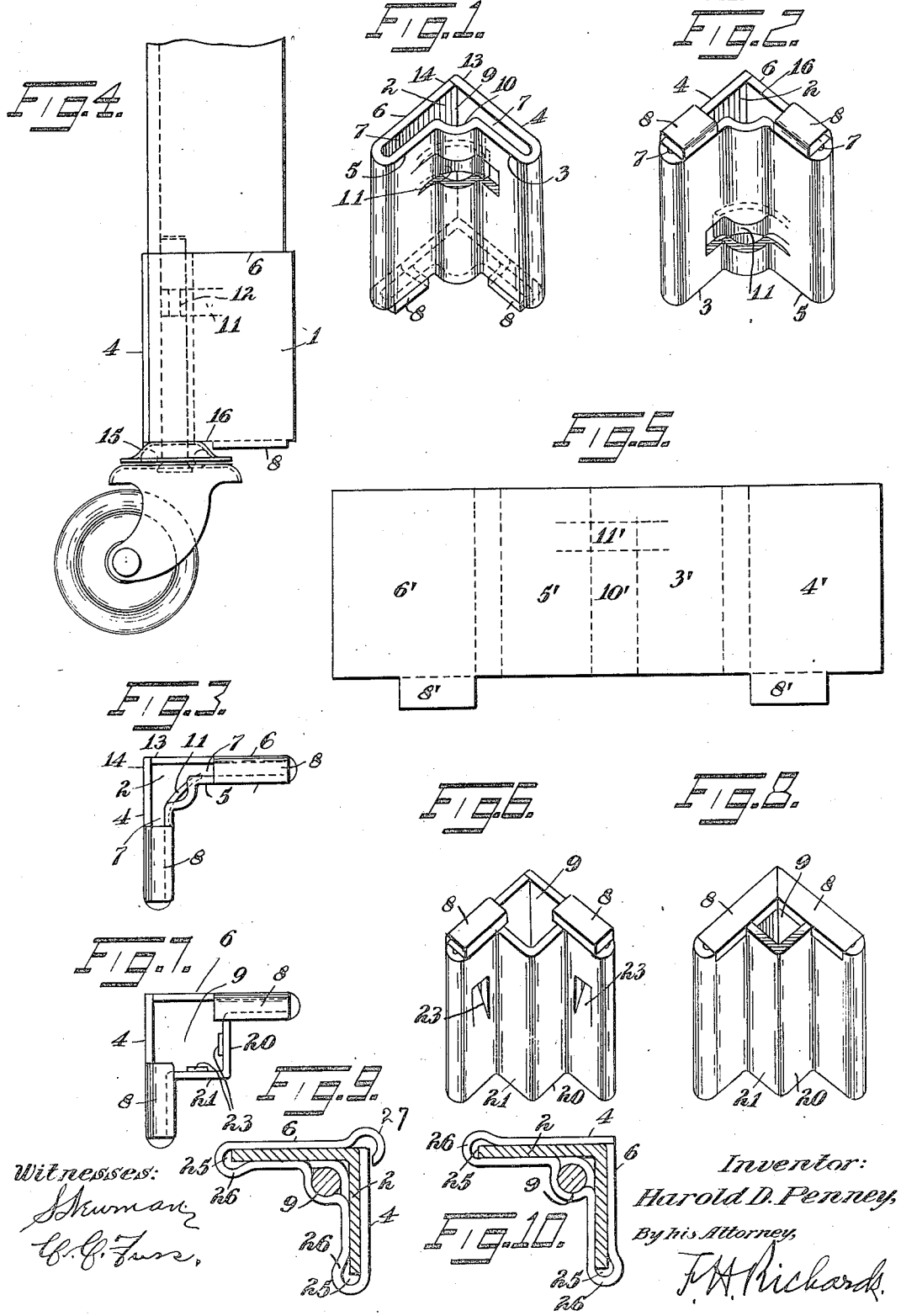

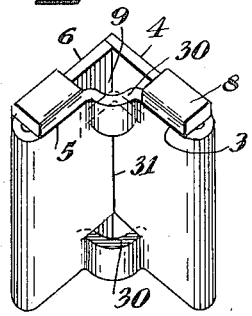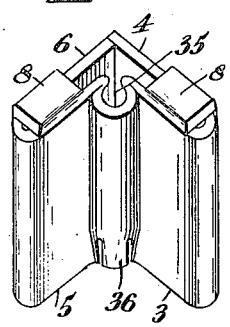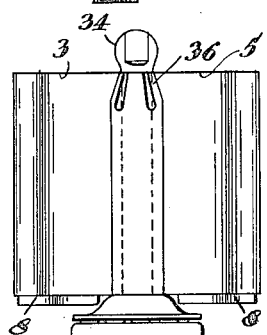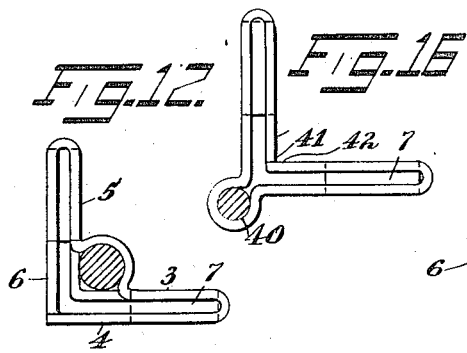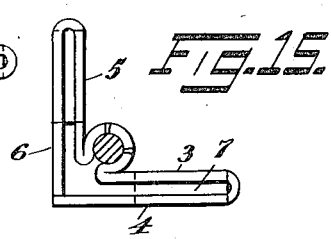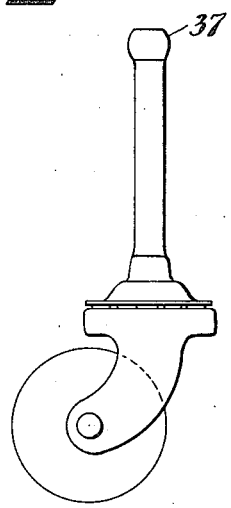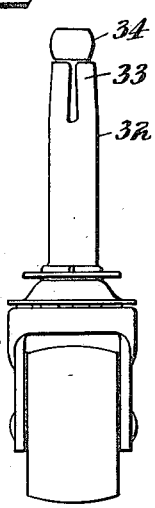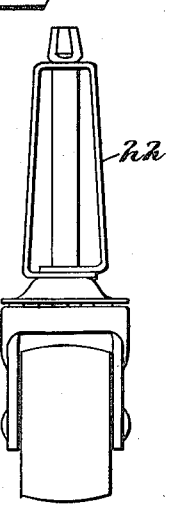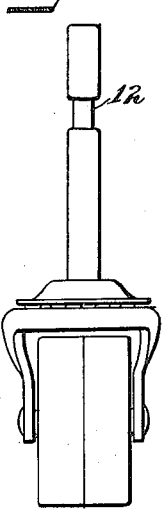

HAROLD D. PENNEY, OF NEW YORK, N. Y., ASSIGNOR TO AMERICAN COUCH COMPANY, OF NEW YORK, N. Y., A CORPORATION OF NEW YORK.

CASTER-HOLDER.

962,461. Specification of Letters Patent. Patented June 28, 1910.

Application filed January 19, 1909, Serial No. 473,088. Renewed December 3, 1909. Serial No. 531,235.

*To all whom it may concern:*

Be it known that I, HAROLD D. PENNEY, a citizen of the United States, residing in New York, borough of Brooklyn, in the county of Kings and State of New York, have invented certain new and useful Improvements in Caster-Holders, of which the following is a specification.

This invention relates to casters, more particularly, however, to the socket or holder of the caster, the object of the invention being to provide an improved caster socket or holder simple in construction and inexpensive to manufacture, and by means of which the caster may not only be readily and effectively secured in position within the socket, but quickly and readily attached to the supporting means, as the leg of a bed or couch, and when attached securely held against premature detachment.

A further object of the invention is the provision of an improved caster socket particularly adapted for use in connection with angle iron members, as for instance the legs of metal beds, couches, couch beds, davenports, divans, and the like, and by means of which the caster will be located practically in the direct line of the thrust or strain on the leg.

Various forms of caster sockets or caster holders for tubular legs have been devised, but they are not adapted for use with angle iron members or legs, with which a large number of metal couches, couch beds and other similar structures are now provided, and so far as I am aware very few, if any, devices usable without the use of rivets or some such fastening means, in other words, usable by being merely slipped on to the leg without requiring any manipulation of the angle iron forming the leg, have been found practicable; and to provide a caster socket or holder particularly adapted for use with the angle iron legs of the structures hereinbefore referred to, and which can be readily slipped on to such legs notwithstanding the varying thicknesses or widths of angle iron, and which when slipped thereon will remain in position, and in the use of which the caster spindles may be readily inserted and when inserted the caster be so located that it will be practically in the direct line of thrust or strain on the leg, is the object of the present improvement.

To provide a practicable device of this character it is desirable that it be so made that it can be readily attached without the use of rivets or other fastening means to the angle iron legs, thus obviating the necessity of any working or manipulation of the legs by the manufacturer of the bed or by the furniture dealer to whom the bed or other structure is shipped, since this would require special machinery for the attachment of the caster socket, and also desirable that it be so made that it can be shipped either with or without the caster but independently of the bed. It is also desirable that the socket be of such form that it can be used if preferred with ordinary forms of casters having spindles and permit the same to be readily and quickly slipped into position in the socket either before or after the socket is attached to the angle iron leg. All of these advantages are obtained by the present improvement, as well as others, among the latter being the provision of a socket which can be made of one piece without the use of rivets or other fastening means and which can also be so made that it can be attached to angle irons of various widths and thicknesses and still firmly grip the same.

In the drawings accompanying and forming part of this specification, Figure 1 is a perspective view of one form of this improved caster socket; Fig. 2 is a perspective view of the socket turned bottom upward; Fig. 3 is a bottom view of the socket shown in Fig. 1; Fig. 4 is a view illustrating an angle iron leg having attached thereto by means of this improved socket a caster; Fig. 5 is a form of blank from which this improved socket may be made; Fig. 6 is a perspective view turned bottom upward, of a caster socket adapted for a somewhat different form of caster spindle; Fig. 7 is a bottom view of the caster socket shown in Fig. 6; Fig. 8 is a perspective view turned bottom upward, of a caster socket adapted for a somewhat different form of caster spindle; Figs. 9 and 10 are top views illustrating caster sockets so constructed that they may be attached to angle iron members of varying widths and thicknesses, these views showing the angle iron members or legs and the caster spindles in section; Fig. 11 is a perspective view turned bottom upward, of a different form of caster socket from that shown in Fig. 1; Fig. 12 is a top view of the socket shown in Fig. 11, with a caster spindle shown in section; Fig. 13 is a perspective view turned bottom upward, of another form of caster socket; Fig. 14 illustrates the same with a caster attached thereto; Fig. 15 is a top view of the socket shown in Figs. 13 and 14, with the caster spindle in section; Fig. 16 is a top view illustrating a somewhat different form of caster socket with a caster spindle shown in section; and Figs. 17, 18, 19 and 20 illustrate casters having various forms of caster spindles.

Similar characters of reference indicate corresponding parts throughout the different views of the drawings.

It is to be noted that this improved socket may be made in various ways, and that it may be more or less modified without departing from the scope of this invention. It is, moreover, to be understood that the expression "caster attaching means" or "caster spindle" is to include a caster spindle or any other means carried thereby, and that the expression "bent" as used in the claims as applied to the socket does not preclude the walls from being formed in any other manner or of any other form suitable for the purpose. This improved caster socket conforms to the shape of the angle iron to which it is attached, and as in the present practice this angle iron is usually of L-shaped formation the present improvement will be described as applicable to that form of angle iron.

In the present embodiment the socket 1 has an angular opening 2 for the reception of an angle iron leg and means for the reception of a caster spindle, whether this comprises simply the spindle or means carried by the spindle, and in the present form this socket is shown as of angular formation and comprises an L-shaped member, although when held in certain positions it could be properly considered as of substantially triangular form. This member 1 comprises two pairs of parallel walls 3 and 4, and 5 and 6, each pair of parallel walls having therebetween a space, as 7, thus forming the angular opening for the angle iron leg. The edges of the walls 4 and 6 may or may not meet, as may be found most desirable in practice, or one edge may overlap the other in any desired or suitable manner. One of the walls of each pair preferably has a portion extending across the space 7 to form a bottom 8 for the angle iron leg.

In practice either the inner or the outer wall of each pair of walls may be provided with this bottom or flange, and this flange may cover substantially the entire space or only a part thereof. In the present embodiment each outer wall 4 and 6 is shown provided with a flange which is turned inward across the space 7 of the socket and thus forms a bottom for the lower edge of the angle iron leg. In the form shown in many of the figures this bottom 8 is of less width than the width of the outer walls. In Fig. 8, however, this bottom flange 8 is shown as of substantially the same width as the walls, whereby it will not only form a bottom covering substantially the entire space 7 between the parallel side walls of the socket, but also constitute a means of decreasing the size of the opening for the caster spindle in the manner hereinafter explained.

Located at the corner of the angular socket, either on the inside or, if preferred, on the outside as shown in Fig. 16, but preferably on the inside, since it is thus centrally located between the two side portions of the socket, is the caster spindle holding portion or opening 9. This may be formed of various shapes, as circular for a round spindle, or partly circular so as to form with the inner corner of the angle iron leg the spindle opening, or it may be of angular formation as shown in Figs. 6, 7 and 8, thereby to form with the inner corner of the angle iron leg a square socket or opening for the reception of a different form of caster spindle, or this caster spindle holding means may be made up of strips or bands, one or more as may be found most desirable in practice.

In the form shown in Figs. 1 and 2 the inner walls 3 and 5 of the caster socket terminate at their inner edges in a half round or semicircular portion 10 extending the entire height of the caster socket. A part of this semicircular portion 10 may be cut out, as at 11, to form a spring clip or locking device, see Fig. 3, extending across the semicircular portion 11, so that when a spindle such as shown in Fig. 20, with a recess 12, is inserted into the socket this clip or locking device will engage the recess 12 and hold the spindle within the socket against premature detachment.

In the form of socket shown in Fig. 1 the outer side walls 4 and 6 have their free edges 13 and 14 in proximity. In this form the flanges 8 are of less width than the width of the side walls 4 and 6, so that when the socket is slipped into position on the angle iron leg one cup or cap, as 15, of the caster will engage the lower edge of the angle iron leg. In other words, by forming the flanges 8 comparatively short or of less width than the width of the outer walls 4 and 6, a recess 16 is formed into which the upper cap or cup of a ball bearing caster may fit, so that the lower edge of the angle iron leg will rest directly thereon, sometimes a desirable feature in some forms of casters. This caster socket may be made from a blank such as that shown in Fig. 5, the outer walls thereof being formed by the portions 4' and 6', the inner walls by the portions 3′ and 5′, and the caster spindle holding portion or opening by the portion 10′, the blank being slotted to form the spring clip portion 11′, the flanges 8 being formed by the projecting portions 8′ of the outer wall forming portions 4′ and 6′, it being merely necessary to bend the blank in any suitable manner along the parallel dotted lines extending crosswise of the blank in order to form the socket, while the portions 8′ are bent along the dotted lines to form the bottom walls or flanges 8 of such socket.

In the form shown in Figs. 6 and 7 the caster spindle holding portion or opening is formed by means of angular walls 20 and 21 for the reception of a caster such as that shown in Fig. 19. In this form of caster the spindle is provided with a spring holding member 22, which is of rectangular shape, and therefore to use this style of caster the opening for the spindle must be of similar shape. Consequently the blank is bent into the form shown in Figs. 6 and 7, thus providing a rectangular socket which may or may not be square as occasion may require. In this form of socket the inner walls 3 and 5 may be provided with inwardly extending resilient portions 23 formed from such walls, if preferred, for engagement with the inner walls of the angle iron legs, thereby to insure a firmer attachment of the socket to the leg should this be necessary, as for instance when the angle iron of which the legs may be made is uneven or has burs thereon.

In the form shown in Fig. 8 the flanges 8 extend substantially the full width of the side walls of the socket, thus entirely closing the space 7 for the angle iron leg, they, however, being flush with the lower edges of the walls 20 and 21 of the spindle opening of the socket. In this form the cap or cup 15 of the caster would engage the flanges 8 and the lower edges of the walls 20 and 21 instead of the lower edges of the angle iron legs, and this may be preferable with some forms of casters. In this form it will be observed that the angular socket for the spindle is somewhat smaller in diameter than that shown in Figs. 6 and 7. It will also be observed that in this form the flanges projecting inwardly of the opening form lips which will prevent the caster spindle from being prematurely detached when a spring member such as 22 is used, since the expansion of the member 22 after it has been compressed to pass into the socket would project portions of such member sufficiently to be overlapped by the lips of the flanges in a manner which will be readily understood.

It is not infrequently the case that the angle irons used for the legs of structures such as those hereinbefore mentioned are of uneven width or thickness, and it is therefore desirable that provision be made for this.

To accomplish this the socket may be made of such size that it will receive the maximum width of angle iron leg. Consequently when in position on a less or minimum width of leg a space 25 would be left between the free edges of the angle iron leg and the end walls forming the socket, see Figs. 9 and 10. To provide for different thicknesses of angle iron, either the inner or the outer walls of the socket may be curved or bulged, as at 26, Figs. 9 and 10, thus enabling sockets to be slipped on to the L-shaped legs and either the outer or the inner walls of the socket sprung outward to compensate for any burs or increased thickness at any part of the angle iron as well as to enable the socket to fit various thicknesses of angle iron.

In the form shown in Fig. 9 one of the outer walls of the angular socket, as for instance the wall 6, is shown provided at its free edge with a bent portion 27 extending around and overlapping the other outer wall 4 of the socket and forming a spring clip or member which not only gives an ornamental appearance to the outer corner of the socket, but also enables the members 4 and 6 to be sprung outwardly a sufficient distance and still be locked, to compensate for various thicknesses of angle iron.

In the form shown in Figs. 11 and 12, instead of forming the spindle opening by bending the blank so as to have a semicircular portion throughout its entire length, at its corner, the blank may be slotted to enable one or more bands or strips 30 to be formed for the engagement of the caster spindle. In this form the caster spindle is held between the corner of the socket 31 and the bands or strips 30, and a form of caster such as that shown in Fig. 18 having a sleeve 32 provided with resilient ends 33, may be used, the resilient sleeve being held in position by an enlarged head 34 of the caster spindle.

In the form shown in Figs. 13, 14 and 15 the caster socket is provided with a spindle opening 35 which is formed by so bending the blank at the corner that it will form substantially a circular opening and thus inclose the spindle at substantially all sides thereof. The upper end 36 of the walls of this opening is slotted to form spring or resilient fingers which will engage under an enlargement or head 37 of a caster spindle such as that shown in Fig. 17. Thus in this form of caster socket the sleeve 32 of the caster shown in Fig. 18 may be entirely dispensed with, the socket itself having means for engaging the enlarged head of the caster spindle and securely holding it therein.

In all of the forms of caster sockets herein described it will be observed that the spindle opening is located not only at the corner of the socket, but substantially centrally of the side portions which grip the angle iron legs, so that the spindle is located substantially in the direct line of thrust or strain on the legs, which is a very desirable feature.

In the form shown in Fig. 16 the socket is constructed in a reverse manner from that shown in the other figures, in that the spindle opening 40 is located at the outer corner of the socket, the blank being bent so as to form such spindle opening while the parallel side walls of the socket are formed by bending the blank with the free edges 41 and 42 on the inside of the angle iron leg instead of on the outside as in the other forms.

It will be observed that in all of the embodiments of the socket shown and described herein the socket is so formed that it will grip both the outer and inner walls of the L-shaped angle iron leg, and thus when slipped thereon firmly engage the same and prevent premature displacement thereof. In practice the socket when made may be shipped with or without the caster to the furniture dealer and by him readily slipped on to the end of an angle iron leg, requiring no manipulation or working of the leg whatsoever by the dealer to attach the socket. Moreover, by this improvement, it is not necessary for the manufacturer to have special tools or machinery for giving any particular shape to the leg in order to attach the socket, so that he can manufacture his article of angle iron with legs of this form and ship the same to the dealer, it being desirable to make such shipments without attachment of the casters to the article. It will also be observed that by means of the present improvement various forms of means carried by the caster spindles for insuring the holding of the caster spindles within the sockets may be dispensed with, since the sockets may be made of such shape that the ordinary spindle, without any additional resilient sleeves or spring members, may be used if preferred, thus dispensing with intermediate holding means between the spindle and the socket such as that shown in Figs. 18 and 19, the socket itself thus constituting the means of holding the caster spindle as well as the means for securing the spindle on to the angle iron leg, thus very much cheapening the cost of production, although without departing from the spirit and scope of this improvement the same form of socket may be used with casters already well known by merely changing the shape of the spindle opening.

I claim as my invention:

1. A caster socket for an angle iron leg having lapping walls forming a socket for gripping the leg both exteriorly and interiorly thereof across substantially the width of such leg and having caster attaching means.

2. An angularly formed caster socket having means for gripping the exterior and interior of an angle iron leg, and also having at the corner thereof bent walls forming means for the attachment of caster attaching means.

3. An angularly formed caster socket having means for gripping the exterior and interior of an angle iron leg, and also having at the corner thereof angular walls forming means for the attachment of caster attaching means.

4. A detachable caster socket having interiorly and exteriorly located lapping walls forming an angular opening for the reception of an angle iron leg and also having means for the reception of caster attaching means.

5. A caster socket for the reception of an angle iron leg, having an integral, resilient, bent portion to receive caster attaching means.

6. A caster socket having an angular opening for the reception of an angle iron leg and having a portion bent to receive caster attaching means.

7. A caster socket having its walls bent to form an angular opening for the reception of caster attaching means.

8. A detachable caster socket having angularly bent walls forming an angular opening for the reception of caster attaching means.

9. A caster socket having an angular opening for the reception of an angle iron leg, and having its walls formed at the corner thereof to form an opening for the reception of a caster attaching means.

10. A caster socket having an angular opening for the reception of an angle iron leg, and also having a bottom wall or walls, and means for the reception of caster attaching means.

11. A caster socket having an angular opening for the reception of an angle iron leg and at the corner thereof, within the walls of such socket, an opening for the reception of a caster spindle, and also having a bottom wall or walls.

12. A caster socket having an angular opening for the reception of an angle iron leg, and also having a bottom wall or walls, and means for the reception of caster attaching means, said bottom wall or walls being of less length than the socket walls thereby to form a recess.

13. A caster socket having an angular opening for the reception of an angle iron leg, and within the walls thereof an opening for the reception of caster attaching means, and also having a bottom wall or walls of less length than walls of the socket, and having parts thereof projecting into the caster attaching means opening.

14. A caster socket having an angular opening for the reception of an angle iron leg, and having a bent wall at the corner thereof forming an opening for the reception of caster attaching means and also having a locking device projecting into said last opening.

15. A caster socket having an angular opening for the reception of an angle iron leg, and having a bent wall at the corner thereof forming an opening for the reception of caster attaching means, and also having a resilient locking device projecting into said last opening.

16. A caster socket having an angular opening for the reception of an angle iron leg, and having a bent wall at the corner thereof forming an opening for the reception of caster attaching means, said socket also having projecting means for engaging the angle iron leg.

17. A caster socket having an angular opening for the reception of an angle iron leg, and having a bent wall at the corner thereof forming an opening for the reception of caster attaching means, said socket also having resilient projecting means for engaging the angle iron leg.

18. A caster socket having an angular opening for the reception of an angle iron leg, and having a bent wall at the corner thereof forming an opening for the reception of caster attaching means, and a plurality of resilient projecting means in the side walls of the socket for engaging the angle iron leg.

19. A caster socket having an angular opening for the reception of an angle iron leg and having a bent wall at the corner thereof forming an opening for the reception of caster attaching means, and having one or more spring fingers for engaging said attaching means.

20. A caster socket having an angular opening for the reception of an angle iron leg and having a bent wall at the corner thereof forming an opening for the reception of caster attaching means and slotted to form one or more spring fingers to engage said attaching means.

21. A caster socket having an angular opening for the reception of an angle iron leg and having a bent band at the corner thereof forming an opening for the reception of caster attaching means.

22. A caster socket having an angular opening for the reception of an angle iron leg, and having a bent wall at the corner thereof forming an opening for the reception of caster attaching means, one wall of said socket bent around the other to form clamping means.

23. A caster socket having an angular opening for the reception of an angle iron leg, and having a bent wall at the corner thereof forming an opening for the reception of caster attaching means, one wall of said socket bent around the other to form resilient clamping means.

24. A caster socket having an angular opening for the reception of an angle iron leg and having a bent wall at the corner thereof forming an opening for the reception of caster attaching means, said socket having greater width than the members of the angle iron leg.

25. A caster socket having an angular opening for the reception of an angle iron leg and having a bent wall at the corner thereof forming an opening for the reception of caster attaching means, said socket having an enlargement at one or both of its edges.

26. A caster socket having an angular opening for the reception of an angle iron leg and having a bent wall at the corner thereof forming an opening for the reception of caster attaching means, said socket having greater width than the members of the angle iron leg and also having an enlargement at one or both of its edges.

27. A caster socket having an angular opening for the reception of an angle iron leg and having a bent wall at the corner thereof forming an opening for the reception of caster attaching means, said socket having greater width than the members of the angle iron leg and an enlargement at one or both of its edges, and also having one wall thereof bent around another to form clamping means.

28. An angular caster socket having a plurality of lapping spaced walls forming an angular opening for the reception of an angle iron leg, and also having means for the reception of a caster spindle.

29. An angular caster socket having a plurality of parallel spaced walls forming an angular opening for the reception of an angle iron leg, and having at the corner thereof a caster spindle opening.

30. An angular caster socket having a plurality of parallel spaced walls forming an angular opening for the reception of an angle iron leg, and having at the corner thereof, interiorly of such socket, a caster spindle receiving means.

31. An angular caster socket having a plurality of parallel spaced walls forming an angular opening for the reception of an angle iron leg, and having at the corner thereof, interiorly of such socket, a caster spindle receiving means, said socket having bottom walls.

32. An angular caster socket having a plurality of parallel spaced walls forming an angular opening for the reception of an angle iron leg, and having at the corner thereof, interiorly of such socket, a caster spindle receiving means, said socket having bottom walls and also having resilient means for engaging a caster spindle.

33. An angular caster socket having a plurality of parallel spaced walls forming an angular opening for the reception of an angle iron leg, and having at the corner thereof, interiorly of such socket, a caster spindle receiving means, said socket having bottom walls and also having resilient means for engaging a caster spindle, one outer wall of said socket overlapping the edge of the other outer wall to form resilient clamping means.

34. An angular caster socket having a plurality of parallel spaced walls forming an angular opening for the reception of an angle iron leg, and having at the corner thereof, interiorly of such socket, a caster spindle receiving means, said socket having bottom walls and also having resilient means for engaging a caster spindle, a portion of each of a pair of said walls having a bulged portion to compensate for different thicknesses of angle iron.

35. An angular caster socket having a plurality of parallel spaced walls forming an angular opening for the reception of an angle iron leg, and having at the corner thereof, interiorly of such socket, a caster spindle receiving means, said socket having bottom walls and also having resilient means for engaging a caster spindle, a portion of each of a pair of said walls having a bulged or enlarged portion to compensate for different thicknesses of angle iron and one outer wall of each pair overlapping the outer wall of the other pair to form a resilient clamping means.

36. A blank for a caster socket comprising a rectangular strip of a length to be folded to form two pair of parallel spaced walls and intermediate thereof a bent wall, and having intermediate its ends a pair of projecting strips adapted to form a pair of bottom walls.

HAROLD D. PENNEY.

Witnesses:
C. A. WEED,
F. E. BOYCE.